US009710832B1

(12) United States Patent
Givens

(10) Patent No.: US 9,710,832 B1
(45) Date of Patent: Jul. 18, 2017

(54) SYSTEM AND METHOD FOR CARD-FUNDED BILL PAYMENT CONCIERGE SERVICE

(75) Inventor: Ann Catherine Givens, Kennett Square, PA (US)

(73) Assignee: JPMorgan Chase Bank, N.A., New York, NY (US)

(*) Notice: Subject to any disclaimer, the term of this patent is extended or adjusted under 35 U.S.C. 154(b) by 557 days.

(21) Appl. No.: 12/557,862

(22) Filed: Sep. 11, 2009

Related U.S. Application Data

(60) Provisional application No. 61/184,958, filed on Jun. 8, 2009.

(51) Int. Cl.
*G07F 19/00* (2006.01)
*H04M 15/00* (2006.01)
*G06Q 30/04* (2012.01)
*G06Q 20/10* (2012.01)
*G06Q 40/00* (2012.01)

(52) U.S. Cl.
CPC .......... *G06Q 30/04* (2013.01); *G06Q 20/102* (2013.01); *G06Q 40/10* (2013.01)

(58) Field of Classification Search
None
See application file for complete search history.

(56) References Cited

U.S. PATENT DOCUMENTS

| | | | | |
|---|---|---|---|---|
| 7,713,121 | B1* | 5/2010 | Luciano et al. | 463/25 |
| 2003/0009401 | A1* | 1/2003 | Ellis | 705/35 |
| 2003/0208443 | A1* | 11/2003 | Mersky | 705/40 |
| 2004/0193516 | A1* | 9/2004 | Fine | G06Q 20/102 705/32 |
| 2005/0187872 | A1* | 8/2005 | Schmidt et al. | 705/40 |
| 2006/0059021 | A1* | 3/2006 | Yulman et al. | 705/4 |
| 2006/0156385 | A1* | 7/2006 | Chiviendacz et al. | 726/2 |
| 2007/0203760 | A1* | 8/2007 | Schmidt et al. | 705/4 |

(Continued)

*Primary Examiner* — Fateh M Obaid
(74) *Attorney, Agent, or Firm* — Hunton & Williams LLP

(57) ABSTRACT

A method for facilitating a card-based bill payment service for a customer of a biller may include (1) receiving a request from the customer to initiate the card-based bill payment service; (2) collecting customer information, the customer information including at least customer account information with the biller and card account information; (3) providing the customer information to the biller over a communications network; and (4) using a computer processor, monitoring the customer's card account for biller activity. A method for facilitating a change from an existing card account to a new card account in a bill payment service for the customer of a biller may include (1) receiving a request to update card information for the bill payment service; (2) receiving the new card account information; (3) providing the existing card account information and new card account information to the biller over a communications network; and (4) using a computer processor, monitoring the customer's new card account for biller activity. A method for transferring funds from an issuer to a biller may include (1) issuing a card to a customer, the card associated with a card account; (2) receiving a invoice for a charge from the biller to the customer; (3) posting the invoice to the customer's card account; and (4) transferring funds related to the invoice to the biller by one of electronic funds transfer and check.

15 Claims, 8 Drawing Sheets

(56) References Cited

U.S. PATENT DOCUMENTS

| | | | |
|---|---|---|---|
| 2009/0112747 A1* | 4/2009 | Mullen et al. | 705/35 |
| 2009/0204529 A1* | 8/2009 | Warsaw et al. | 705/35 |
| 2009/0307117 A1* | 12/2009 | Greiner et al. | 705/34 |
| 2010/0094740 A1* | 4/2010 | Richter | 705/35 |
| 2010/0100480 A1* | 4/2010 | Altman et al. | 705/40 |
| 2010/0217706 A1* | 8/2010 | Griffin et al. | 705/40 |

* cited by examiner

Card Funded Bill Payment ~ Concierge Service Form

Please enter necessary information in all yellow fields, and verify those in grey
All fields in yellow are Mandatory

Date: auto filled

Customer Name: Bob Smith    Billing Address: 100 Main St

Chase Number: 5111-1111-1111-1110    City: Anywhere

Carrier: Carrier X    State: drop down

Billing Zip Code: 12345

Wireless Information

Payment Type: Enroll in Autopay

Wireless Account Number:    Verizon Only - +5 digits

Mobile phone number: (125) 874-9685    Card Expiration Date: 2010 YEAR / 6 MONTH Payment type: Credit Card    CVV2: 1234567

Credit card number: 5111-1111-1111-1110    Payment Day Options: NOT NEEDED

Card Type: MasterCard    Account Nickname: NOT NEEDED

Name on Card: Bob Smith nickname used to identify your card more easily

Fig. 3

Mandatory data elements required by Merchants for all recurring bill set-ups

1. Date
2. Name
3. Billing Address
4. City
5. State
6. Billing Zip Code
7. Payment type = credit card  (Default on form)
8. Credit card account number (16 digits)
9. Card type – Visa or MasterCard
10. Name on Card
11. Card Expiration Date
    1. Month (single digit)
    2. Year (4 digits)

Additional Data Elements Required for Telecom

1. Name of Service:
   - Autopay: Verizon, AT&T
   - Automatic Payment: Sprint
   - EasyPay: T-Mobile
2. Account number:
   - Verizon: xxxxxxxxx-xxxxx (9 + 5)
   - AT&T, Sprint, T-Mobile: xxxxxxxxx (9)
3. Mobile phone number (10 digits)
4. CVV2: Sprint & AT&T
5. Payment day options
   - Verizon only: choose to have bill paid on the following calendar days: 1, 2, 3, 4, 29, 30
2. Account nickname:
   - Verizon only - 33 characters
   - Nickname used to identify your card more easily)
   - Default to Chase Credit Card
3. Optional data elements
   - Customer code: Verizon only - 23 characters

Additional Data Elements Required for Cable

1. Name of Service
   - Autopay: Verizon, Dish Network
   - Ecobill: Comcast
   - PayXperss: Time Warner
2. Daytime phone number: Verizon
3. Email address: Verizon

Fig. 4

Customer Authorization to Set up Automatic Payment
Questions: Call 1-866-xxx-xxxx <Date>
<Biller Name>

Authorization Number: xxxxxxxxxx

Please set <customer name> up on automatic bill payment for <his/her> <biller name> bill

Customer Information

<Customer Name>
<Customer billing address>
<Customer billing address>
<Customer City, State and Zip code>

Account Information

<biller name> Wireless account number: <xxxxxxxxx xxxxx>
<biller name> Wireless phone number: <xxx-xxx-xxxx>

Payment Details

Payment Type: Credit Card
Name on Card: <customer name on card>
Card Type: <Visa/Mastercard>
Credit Card Number: <xxxx-xxxx-xxxx-xxxx>
Card Expiration Date: <YYYY/MM>

Legal Disclosure

Our mutual customer identified above has requested that BANK amend their payment information with <biller name>. BANK has a service name whereby we notify our customers' billers and instruct them to set up their bills to be paid automatically each month. BANK has obtained customer consent and authorization to have their account with you paid automatically each month with their BANK Credit Card (see Payment Details section above).

The agreement between the merchant and the customer is not altered unless notified by the customer with appropriate and acceptable notification to the merchant For chargeback purposes, this notification form may be relied upon as evidence to amend your billing records. Following receipt by it, the merchant shall be solely responsible for safeguarding and ensuring proper use of this information in accordance with its agreement with the customer. BANK shall not have any liability for any misuse of this information. This message is intended for the addressee only. It contains information that is private and confidential and is subject to U.S. privacy laws. Any use of this information by persons other than the addressee is prohibited. If you have received this message in error, please telephone the sender at the above number and destroy all copies of this message.

Fig. 5

SYSTEM AND METHOD FOR CARD-FUNDED BILL PAYMENT CONCIERGE SERVICE

CROSS-REFERENCE TO RELATED APPLICATIONS

The present application claims priority to U.S. Provisional Patent Application Ser. No. 61/184,958 filed Jun. 8, 2009, the contents of which are hereby incorporated by reference in their entirety.

BACKGROUND OF THE INVENTION

1. Field of the Invention

The present invention generally relates to automated bill payment, and, more particularly, to a system and method for card-funded bill payment concierge service.

2. Description of the Related Art

Automated bill payment has become increasingly popular with customers and service providers alike. Using automated bill payment, instead of writing a monthly check for a bill, the customer provides the service provider with bank account information. When a bill is due, for example, monthly, the service provider automatically debits the bank account for the amount of the bill. This may be achieved by the service provider debiting the customer's bank account, or by the customer pushing a payment to the service provider.

SUMMARY OF THE INVENTION

Methods for facilitating a card-based bill payment service for a customer of a biller are disclosed. According to one embodiment, the method includes (1) receiving a request from the customer to initiate the card-based bill payment service; (2) collecting customer information, the customer information including at least customer account information with the biller and card account information; (3) providing the customer information to the biller over a communications network; and (4) using a computer processor, monitoring the customer's card account for biller activity. In one embodiment, the bill payment service may be related to a recurring cost. In another embodiment, it may be a one-time cost.

In one embodiment, the card account may be a credit card account or a debit card account. In another embodiment, the request may be received by an email, an on-line form, etc.

In one embodiment, the step of collecting customer information may include retrieving the card account information from a computer database.

In one embodiment, the step of providing the customer information to the biller over a communications network may include retrieving, from a computer database, an identification of information required by the biller to initiate the card-based bill payment service; and using a computer processor, formatting the customer account information with the biller and card account information for the biller according to the retrieved identification information.

In one embodiment, the method may further include the step of notifying the customer of biller activity.

In one embodiment, the step of monitoring the customer's card account for biller activity may include storing, in a database, at least one previous bill amount from the biller, and based on the at least one previous bill amount, notifying the customer if a current bill amount is outside of an expected range.

Methods for facilitating a change from an existing card account to a new card account in a bill payment service for the customer of a biller are disclosed. According to another embodiment, a method may include (1) receiving a request to update card information for the bill payment service; (2) receiving the new card account information; (3) providing the existing card account information and new card account information to the biller over a communications network; and (4) using a computer processor, monitoring the customer's new card account for biller activity.

The method may also include providing customer information for a customer account with the biller to the biller.

In one embodiment, the step of receiving a request to update card information for the bill payment service may include receiving a notification from the new card issuer.

In one embodiment, the step of receiving a request to update card information for the bill payment service may include receiving the request from the customer.

The method may also include notifying the customer of biller activity on the customer's new card account.

In one embodiment, the step of monitoring the customer's card account for biller activity may include using a computer processor, monitoring the customer's existing card account for biller activity; and notifying the customer of biller activity on the existing card account.

Methods for transferring funds from an issuer to a biller are disclosed. According to another embodiment, a method may include (1) issuing a card to a customer, the card associated with a card account; (2) receiving a invoice for a charge from the biller to the customer; (3) posting the invoice to the customer's card account; and (4) transferring funds related to the invoice to the biller by one of electronic funds transfer and check.

The charge may be the result of a relationship between the customer and the biller. In one embodiment, the bill payment service may be related to a recurring cost. In another embodiment, it may be a one-time cost. The card may be a credit card or a debit card. The electronic funds transfer may be an automated clearing house transaction, and the invoice may be an electronic invoice.

The method may further include issuing a card to a second customer, the card associated with a second card account; receiving a second invoice for a charge from the biller to the second customer; posting the second invoice to the second customer's card account; and aggregating the invoice and the second invoice to a combined invoice; and the step of transferring funds related to invoice to the biller by one of electronic funds transfer and check may include transferring funds related to the combined invoice to the biller.

It is a technical advantage of the present invention that methods for facilitating a card-based bill payment service for a customer of a biller are disclosed. It is another technical advantage of the present invention that method for facilitating a change from an existing card account to a new card account in a bill payment service for the customer of a biller are disclosed. It is yet another technical advantage of the present invention that methods for transferring funds from an issuer to a biller are disclosed.

BRIEF DESCRIPTION OF THE DRAWINGS

For a more complete understanding of the present invention, the objects and advantages thereof, reference is now made to the following descriptions taken in connection with the accompanying drawings in which:

FIG. 3 is an example of a concierge service input form according to an embodiment of the present invention;

FIG. 4 is an example of data required by telecom merchants for establishing a card-funded bill payment according to an embodiment of the present invention;

FIG. 5 is an example of a form that may be used to send the customer information to the biller to set up a card-funded bill payment according to an embodiment of the present invention;

DETAILED DESCRIPTION OF PREFERRED EMBODIMENTS

Figure 1:
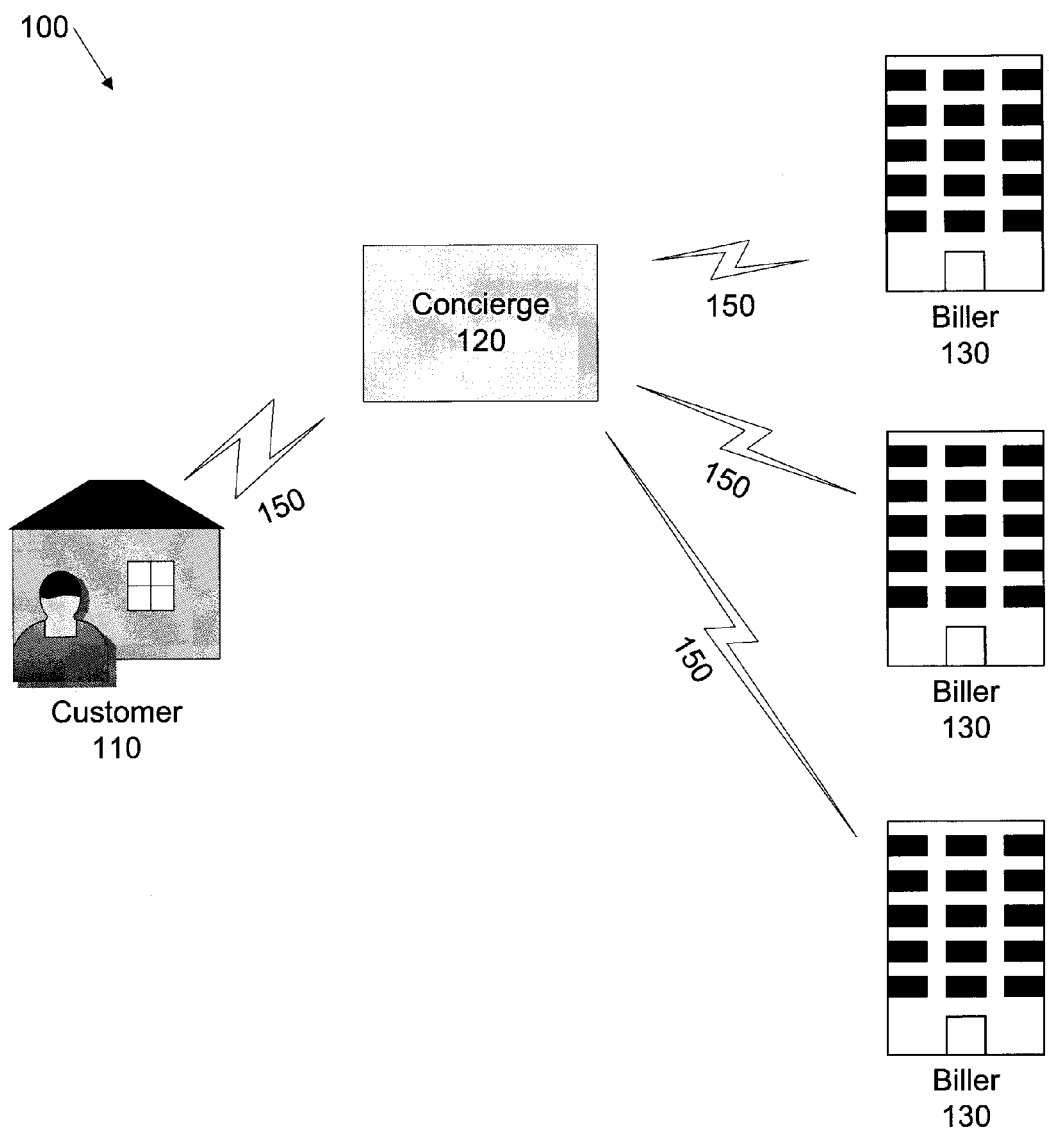
FIG. 1 is an illustration of a system for card-funded bill payment according to an embodiment of the present invention.

Several embodiments of the present invention and their advantages may be understood by referring to FIGS. 1-8, wherein like reference numerals refer to like elements.

The following disclosures are related to the present invention: U.S. Pat. No. 6,965,865, entitled "System And Method For Integrated Customer Management"; U.S. Provisional Patent Application Ser. No. 60/264,681 and U.S. patent application Ser. No. 09/814,783, both entitled "System And Method For Bill Pay And Presentment"; U.S. patent application Ser. No. 11/390,177, entitled "Credit Instrument And System Providing Multiple Services Including Access To Credit Services And Access To A Service Provider Club"; U.S. Pat. No. 7,499,887 entitled "System and Method for Card Processing With Automated Payment of Club, Merchant, and Service Provider Fees"; U.S. Pat. No. 6,882,984, entitled "Credit Instrument And System with Automated Payment of Club, Merchant and Service Provider Fees"; and U.S. patent application Ser. No. 10/930,835, entitled "Electronic Acquisition Of Bill Payment Information From A Financial Account." Each of these documents, and any continuations, is hereby incorporated by reference, in its entirety.

Although the terms "credit card" and "debit card" may be used herein, it should be recognized that, in addition to credit and debit cards, prefunded cards, stored value cards, margin accounts, and similar payment devices and/or instruments are within the scope of the present invention.

Referring to FIG. 1, a block diagram of a system for a bill payment concierge service is provided. System 100 includes at least one customer 110, concierge 120, and at least one biller 130. In one embodiment, customer 110 may be an individual. It should be recognized, however, that customer 110 may include any type of customer (e.g., business, organization, government entity, school, private banker, etc.) that may use card-funded bill payment to pay its bills.

Biller 130 may be any entity that issues bills to customer 110. In one embodiment, biller 130 may be an entity that provides goods or services to customer 110. For example, biller 130 may be a service provider, such as a telecommunications provider (e.g., landline, wireless, satellite, etc.), a cable/satellite television provider, an internet provider, an insurance provider (e.g., auto, property, life, health, etc.), etc. Biller 130 may include other types of goods or services providers, including individuals, as necessary and/or desired.

In one embodiment, customer 110 may have an established relationship with biller 130. In another embodiment, customer 110 may seek to establish a relationship with biller 130 for goods and/or services.

In one embodiment, biller 130 may accept credit cards or debit cards for payment. In another embodiment, biller 130 may accept electronic funds transactions (e.g., ACH transactions) for payment. In still another embodiment, biller 130 may accept paper checks, cash, transfers, etc. for payment.

In one embodiment, concierge 120 may serve as an intermediary between customer 110 and biller 130. In one embodiment, concierge 120 may be any type of business entity including, for example, an independent business entity, a business entity that is associated with and/or part of a bank, a business entity that is associated with and/or part of a credit issuer, an entity associated with a credit union, on shore and off shore entities, lockbox providers, third party providers, etc.

In one embodiment, concierge 120 may have a direct relationship with biller 130. This relationship may be used to facilitate the arrangement of card-funded bill payment, provide payments by alternate payment mechanisms, etc.

In one embodiment, customer 110 may already have an established relationship with concierge 120 or with an entity that is associated with concierge 120. For example, concierge 120 may be associated with, or part of, customer 110's credit card or debit card issuer.

Customer 110, concierge 120, and biller 130 may communicate by communication medium 150. Communication medium 150 may be any suitable communication medium or network, including the Internet, telephone lines, wireless communication networks, etc. Any suitable method or means for communication may be used, including voice communication, electronic mail, SMS/MMS (e.g., "texting") communication, instant messaging, live chat, facsimile, online submission, U.S. postal service, overnight delivery, secure encrypted transmission, etc. Other suitable communication methods or means may be used as necessary and/or desired. In one embodiment, confirmation of receipt of a communication may be provided.

Figure 2:
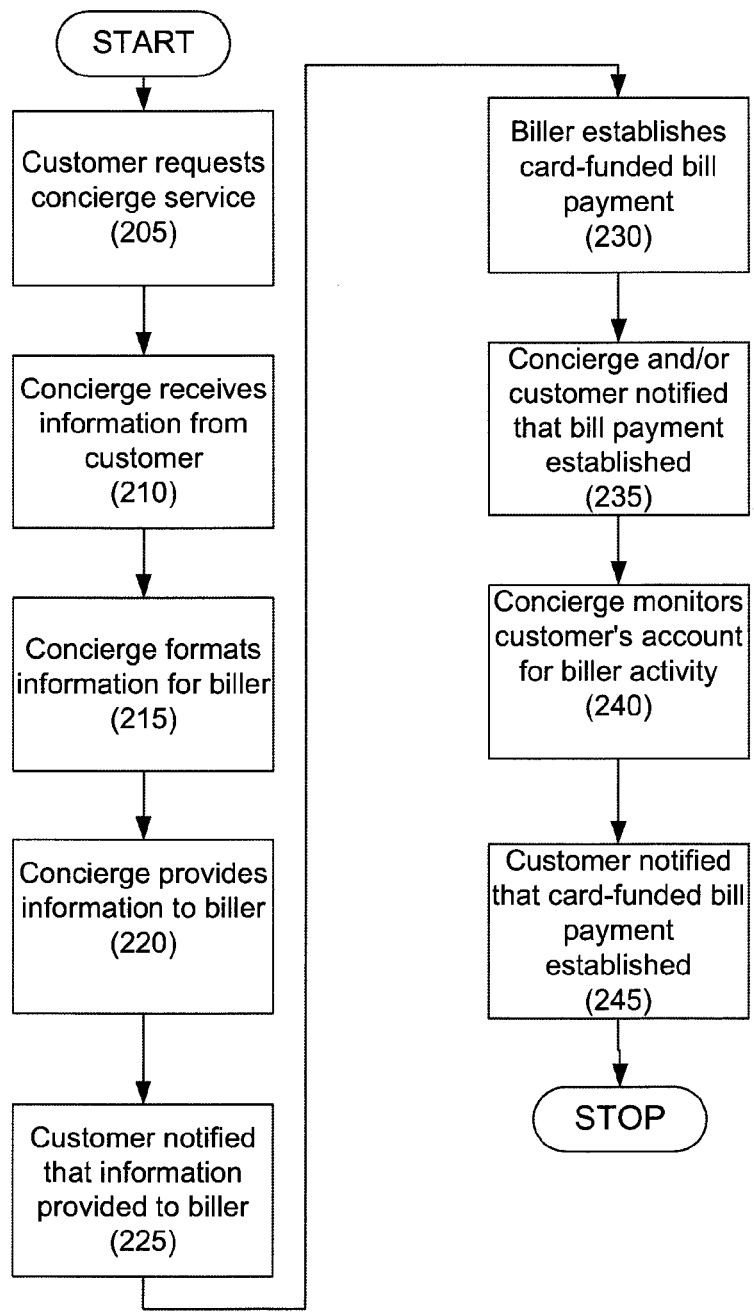
FIG. 2 is a flowchart depicting a method for card-funded bill payment according to an embodiment of the present invention.
Figure 6:
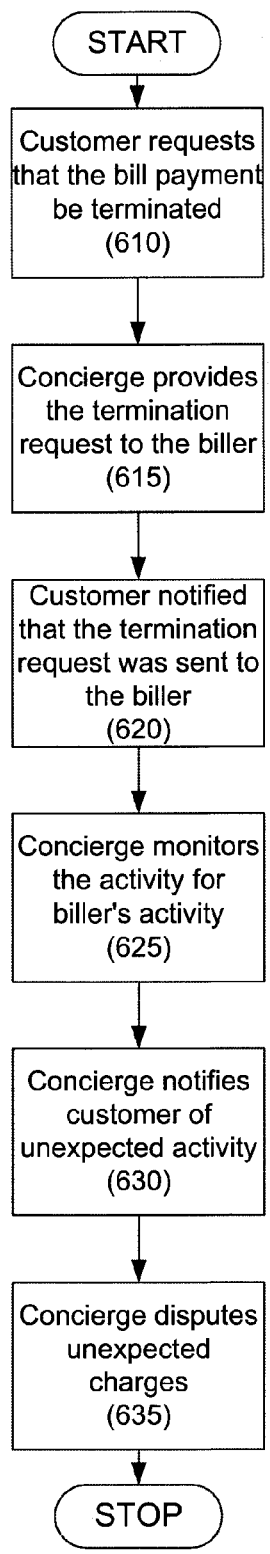
FIG. 6 is a flowchart depicting a method for terminating a card-funded bill payment according to an embodiment of the present invention.

Referring to FIG. 2, a method of implementing a bill payment concierge according to one embodiment of the invention is presented. In step 205, the customer contacts the concierge to request the bill payment concierge service to establish a bill pay arrangement with a biller. In one embodiment, the customer may already have a relationship with the biller. In another embodiment, the customer may seek to establish a relationship with the biller.

In one embodiment, the customer may initiate contact with the concierge to establish the bill payment concierge service. In another embodiment, the concierge may contact the customer with information about the bill payment concierge service. In still another embodiment, the biller may contact the customer with information about the bill payment concierge service. Other processes for initiating the bill payment concierge service may be used as necessary and/or desired. The contact between the customer and the concierge may be by any suitable communication medium.

In one embodiment, the customer may contact the concierge in response to a solicitation from the concierge by, for example, direct mail or by email, live chat, SMS/text, instant message, online banner, etc.

In step 210, the concierge receives necessary information from the customer. In one embodiment, the customer may provide this information by telephone. In another embodiment, the customer may provide this information electronically by, for example, email, live chat, on-line submission, etc. In still another embodiment, the customer may provide this information by facsimile. In yet another embodiment, the customer may submit this information by SMS/MMS messaging. In another embodiment, the customer may provide this information in a voice communication. In still another embodiment, this information may be retrieved from previous transactions.

In one embodiment, the concierge may retrieve some or all of the customer information from a database. In one embodiment, the database is maintained by an entity with which the concierge has a relationship. For example, in one embodiment, the concierge may retrieve name, address, telephone number, credit/debit card account information, etc. for the customer from a database maintained by a credit card or debit card issuer with which the concierge maintains a relationship.

In one embodiment, the concierge may collect information regarding an on-line account (e.g., username, password) with the biller.

In another embodiment, the biller may provide the concierge with a password so that the concierge may access the customer's on-line account. For example, in one embodiment, the concierge may be provided with a restricted use password that will allow the concierge to access the customer's account information, but not make any changes. In another embodiment, the concierge may be provided with a password that allows the concierge to enter the customer's credit card information as the source of payment.

In another embodiment, the concierge may set up a on-line account on behalf of the customer. In one embodiment, the concierge may be provided with information necessary to create the account by the customer.

In one embodiment, the concierge may receive all required information from the customer at one time. In another embodiment, the concierge may collect partial information at one time, and receive the other information later or by another method. For example, the concierge may retrieve customer information from a database, but retrieve information concerning the account with the biller from the customer. In another embodiment, the concierge may retrieve information from the issuer should a credit card number change or be updated.

In one embodiment, the concierge may include an interactive voice response system which may allow at least some information to be collected with no or reduced human interaction on behalf of the concierge. In one embodiment, a customer may be able to use interactive menus to, for example, select a biller from a list, enter an account number with the biller, etc.

In step 215, the concierge may format the information provided by the customer for submission to the biller. In one embodiment, the concierge may be provided with forms that are to be completed and provided to the biller. The concierge may have a specific form for each biller, or it may have a form that may be used by more than one biller.

An example form for completion by the concierge is shown in FIG. 3. In another embodiment, a similar form may be provided for the customer to complete and submit. In one embodiment, the form may be submitted electronically, by fax, etc. or the form may be completed on-line.

In one embodiment, the concierge may maintain a database of required information that is specific to each biller. An example of such information for several telecom merchants is provided in FIG. 4. As noted above, the concierge may have a direct relationship with the biller and may contact the biller to determine the required information.

In one embodiment, the information may be formatted automatically.

In one embodiment, some or all of the data that is collected and/or retrieved may be encrypted and/or safeguarded.

Referring again to FIG. 2, in step 220, the concierge provides information to the biller. In one embodiment, the concierge may send a hard copy letter to the biller requesting that card-funded bill payment be arranged.

An example form that may be used to send the customer information to the biller to set up a card-funded bill payment is provided in FIG. 5.

In another embodiment, the biller and the concierge may have a relationship established to facilitate the arrangement of card-funded bill payment. In one embodiment, the concierge may have at least one point of contact established at the biller to assist in processing the card-funded bill payment request, resolve issues, etc. In one embodiment, the concierge and the biller may communicate via any suitable medium, including letter, phone, fax, email, text, webform, etc.

In another embodiment, the concierge may request card-funded bill payment for the customer by accessing the biller website at the request of the user. This may be particularly useful for non-technical savvy customers. In one embodiment, the customer may provide login information for the biller's website (e.g., user id, password) to the concierge. In another embodiment, the customer may provide the concierge with information to set up an on-line account at the biller's website on behalf of the customer.

In one embodiment, the concierge may use an data aggregator application that allows the concierge to establish an on-line account for the customer without having access to the customer's log-in or password. In one embodiment, the data aggregator may allow the concierge to establish web account with the biller on behalf of the customer, may allow the concierge to set up a card-funded bill payment, may allow the concierge to modify an existing card-funded bill payment, and may allow the concierge to make payments on behalf of the customer.

An example of a data aggregator is DirectPay™, available from Yodlee, Inc., Redwood City, Calif. Other data aggregators may be used as necessary and/or desired.

Referring again to FIG. 2, in step 225, after the concierge provides information to the biller, the concierge notifies the customer that the information has been provided to the biller. In one embodiment, the concierge may provide additional information to the customer. For example, the concierge may inform the customer when it can expect the first payment to occur. The concierge may provide additional information as necessary and/or required.

The notification may occur by any suitable means, including, for example, mail, email, text, facsimile, telephone, automated voice systems, SMS/text, alerts, etc.

In step 230, the biller may establish the card-funded bill payment.

In step 235, the biller may notify the concierge and/or the customer that the card-funded bill payment has been established. If the biller does not notify the customer, the concierge may then notify the customer.

In step 240, the concierge may monitor activity on the customer's account for biller activity.

In step 245, the concierge notifies the customer when it monitors biller activity indicating that the card-funded bill payment has been established.

After the card-funded bill payment is established, in one embodiment, the concierge may monitor the biller's activity and report on any abnormal events. In one embodiment, the concierge may maintain, in a database, a history of some, or all, of the past charges with the biller. In response to an abnormal billing cycle—for example, a charge is excessively high or low, there are multiple charges in a billing cycle, there are no charges in a billing cycle, etc.—the concierge may notify the customer by any suitable communications means.

In one embodiment, the concierge may provide an overlimit feature for customers. This may be used when, for example, the customer's credit limit will be exceeded by the biller's charge. In one embodiment, this may be provided only to preferred customers.

In one embodiment, a loan may be provided. This may be an automated feature. In another embodiment, the customer may be permitted to exceed its credit limit without penalty. Other overlimit features may be provided as necessary and/or desired.

In one embodiment, the card-funded bill payment may automatically recur until it is stopped, cancelled, or updated by the concierge and/or customer. In another embodiment, the card-funded bill payment may be set to recur for a predetermined time, number of billing cycles, etc.

In one embodiment, the concierge may facilitate changes associated with an established card-funded bill payment. For example, referring to FIG. 6, a flowchart depicting the termination of card-funded bill payment is provided. In step 610, the customer requests that the card-funded bill payment be terminated. This may be requested by any suitable method, including mail, email, voice communication, text, on-line request, facsimile, etc.

In step 615, the concierge receives the request, and provides the termination request to the biller. Depending on the relationship with the biller, this may be provided by any suitable means, including email, telephone, facsimile, text, on-line submission, accessing the customer's on-line account with the biller, etc.

In one embodiment, the concierge may use the Visa Preauthorized Payment Cancellation Service to stop bill payments from being authorized, cleared and settled on a cardholder's behalf. Using this system, the concierge or issuer may place a stop order on the Visa Cardholder Database using file maintenance message. This blocks the account from receiving any other bill payment transactions from that merchant.

In another embodiment, the concierge may use VISA Online Resolve to resolve the dispute. In still another embodiment, the concierge may use the MasterCard Recurring Payment Cancellation System. Other applications may be used as necessary and/or desired.

In step 620, the concierge may notify the customer that the termination request was sent to the biller.

In step 625, the concierge monitors the account for biller's activity.

In step 630, in one embodiment, the concierge may notify the customer of any activity from the biller after a certain period following the termination request. For example, it may be expected that a biller may require at least one additional billing period following the receipt of a termination request to bring the customer's account current. Following that time, any additional charges from the biller may be improper.

In one embodiment, in step 635, the concierge or issuer may automatically dispute charges outside of this period. This may be done on behalf of the customer. In another embodiment, the concierge or issuer may remove any late fees associated with these charges.

In one embodiment, the concierge may inform a credit agency (e.g., Experian, Equifax, TransUnion) of the disputed charge so it does not affect the customer's credit rating.

In another embodiment, the concierge may inform the customer of such charges and request instructions from the customer. For example, the customer may be given the option of disputing the charges, ignoring the charges, having the concierge contact the biller to request information, etc.

Figure 7:
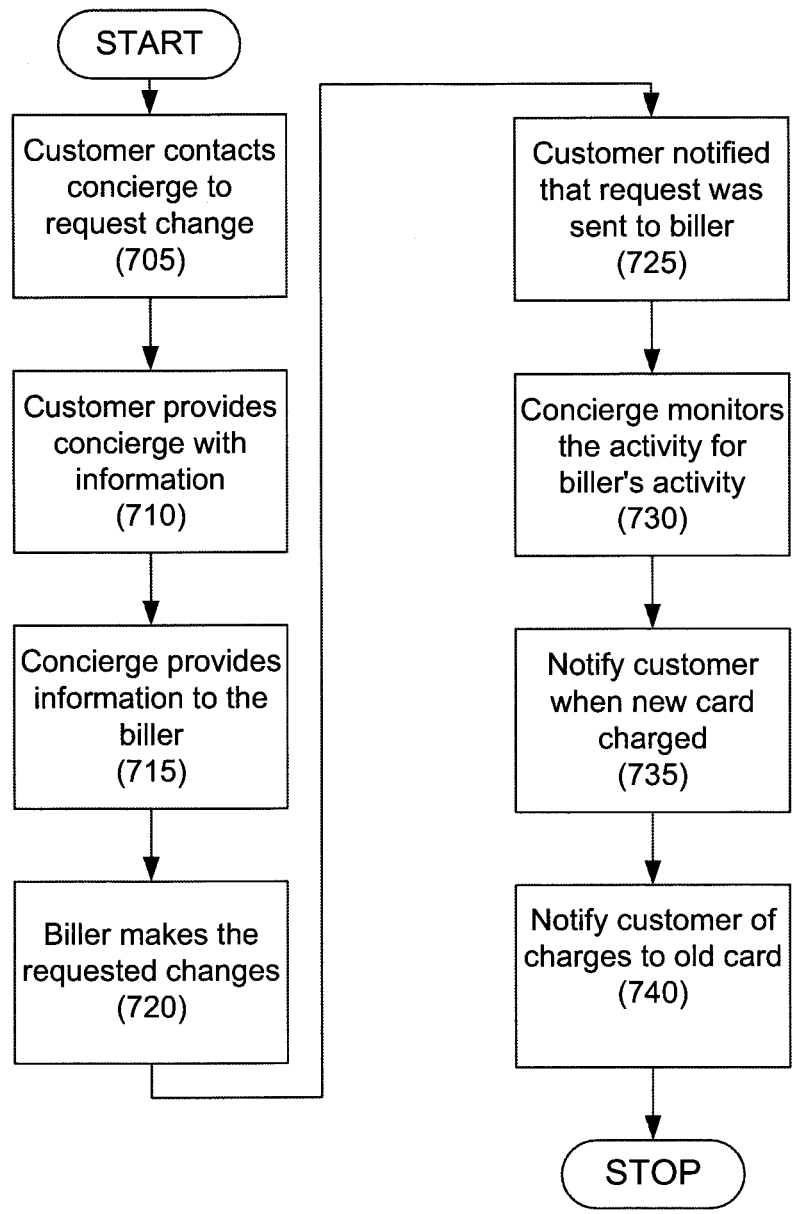
FIG. 7 is a flowchart depicting a method for changing card information in a card-funded bill payment according to an embodiment of the present invention.

Referring to FIG. 7. the concierge may also facilitate a change in credit card or debit card information for the customer. For example, the customer may wish to maintain an established card-funded bill payment, but instead use a different account or type of card (e.g., credit instead of debit). In one embodiment, the credit/debit cards may be from the same issuer. In another embodiment, the credit/debit cards may be from different issuers.

In step 705, the customer contacts the concierge to request an update in billing information. This request may be made by mail, voice communication, text, on-line request, facsimile, etc.

In step 710, the customer provides the concierge with information including, for example, the card-funded bill payment to be modified and the account number for the new credit/debit card.

In step 715, the concierge receives the information and provides it to the biller. Depending on the relationship with the biller, this may be provided by any suitable means, including email, telephone, facsimile, text, on-line submission, accessing the customer's on-line account with the biller, etc.

In step 720, the biller makes the requested changes to the established card-funded bill payment.

In step 725, the concierge may notify the customer that the change request was sent to the biller.

In step 730, the concierge monitors the activity for biller's activity to confirm that change was made.

In step 735, the concierge may notify the customer when the biller charges the new credit or debit card.

In step 740, the concierge may notify the customer of any charges on the old credit or debit card after the change is implemented, indicative of multiple charges.

In one embodiment, the concierge may automatically dispute charges outside of this period. This may be done on behalf of the customer.

In another embodiment, the concierge may inform the customer of such charges and request instructions from the customer. For example, the customer may be given the option of disputing the charges, ignoring the charges, having the concierge contact the biller to request information, etc.

In one embodiment, the customer may make the change in credit or debit cards by accessing an on-line form, and providing the requested information.

In one embodiment, the concierge may automatically update the biller with any changes to the customer's billing information. For example, the issuer may inform the concierge if the customer is being issued a new credit card number, new expiration data, new credit card security code (or card verification value), etc. This may be because a card was stolen, because a card expired, etc. When this occurs, in one embodiment, the concierge may update the biller with the new card information without waiting for the customer to request this service. In another embodiment, if required, the concierge may seek permission from the customer to inform the issuer of the change.

There are several business reasons that a biller may find the card-funded bill payment concierge attractive. For example, using a card-funded bill payment system greatly reduces the amount of manual labor and paperwork associated with bill payment. Further, customers may be more loyal to a biller that allows card-based automated bill payment as the customer may earn rewards (e.g., points, miles, cash back, etc.) based on spending associated with that card. Thus, there may be a reduction in customer attrition, and there may be a reduction in acquisition cost. Further, customers using a card-funded bill payment system may be less likely to be delinquent, and may be more likely to spend more.

Despite these (and other) advantages, billers may be reluctant to use cards for bill payment because of the costs/fees associated with doing so versus other payment methods. In one embodiment, the concierge and/or the card issuer may provide the biller with incentives, rebates, etc. for implementing the automated card-funded bill payment service. Thus, the issuer may provide rebates, credits, goods and/or services, preferred status, and/or other incentives to the biller to offset or lower the associated payment processing fees.

Figure 8:
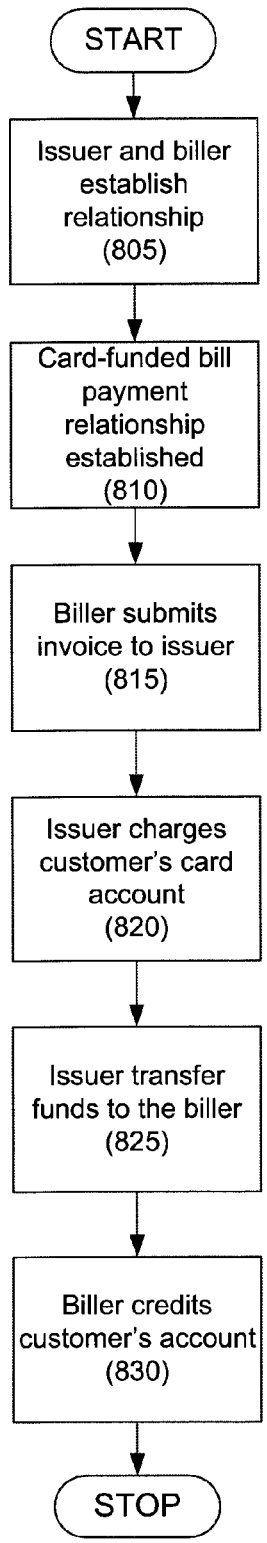
FIG. 8 is a flowchart depicting a method of invoice and payment for a card-funded bill payment according to an embodiment of the present invention.

In one embodiment, the issuer may aggregate and pay the biller through a different settlement system. For example, the issuer and biller may arrange for alternative payment mechanisms, such as the less-costly ACH system, to be used. Referring to FIG. 8, in step 805, the issuer and the biller establish a payment relationship for alternate billing/payment.

In one embodiment, the issuer and biller may already have a private label relationship. In another embodiment, the biller may submit invoices to the issuer. Other payment relationships may be used as necessary and/or desire.

In step 810, a card-funded bill payment relationship between the customer and the biller is established. This may be established by the concierge or issuer, as discussed above, or it may be established by the customer.

In step 815, instead of charging the customer's credit card account, the biller submits an invoice to the issuer for a charge to the customer. The invoice may be submitted by any suitable method, including electronic, paper, etc.

In another embodiment, the invoice may be received as part of a private label transaction.

In step 820, the issuer processes the invoice and charges the customer's card account. In one embodiment, from the customer's perspective, it may appear that the biller charged the customer's card account directly.

In step 825, the issuer transfers funds to the biller. In one embodiment, this may be for the invoiced amount. In another embodiment, this may be for less than the invoiced amount. This may be where the biller and issuer are sharing in the savings associated with reduced payment processing fees.

In one embodiment, the funds may be transferred by an electronic funds transfer, such as automated clearing house. In another embodiment, the funds may be transferred by check. In still another embodiment, the funds may be offset by charges against the biller. For example, the funds may be included in a periodic net settlement between the biller and the issuer.

In one embodiment, the issuer may aggregate invoices for a plurality of customers and transfer funds to the biller for this aggregation of invoices.

In step 830, the biller credits the customer's account with the biller.

In another embodiment, to further reduce ACH fees, the issuer may aggregate payments for multiple customers and provide a single payment by ACH.

Hereinafter, general aspects of implementation of the systems and methods of the invention will be described.

The system of the invention or portions of the system of the invention may be in the form of a "processing machine," such as a general purpose computer, for example. As used herein, the term "processing machine" is to be understood to include at least one processor that uses at least one memory. The at least one memory stores a set of instructions. The instructions may be either permanently or temporarily stored in the memory or memories of the processing machine. The processor executes the instructions that are stored in the memory or memories in order to process data. The set of instructions may include various instructions that perform a particular task or tasks, such as those tasks described above. Such a set of instructions for performing a particular task may be characterized as a program, software program, or simply software.

As noted above, the processing machine executes the instructions that are stored in the memory or memories to process data. This processing of data may be in response to commands by a user or users of the processing machine, in response to previous processing, in response to a request by another processing machine and/or any other input, for example.

As noted above, the processing machine used to implement the invention may be a general purpose computer. However, the processing machine described above may also utilize any of a wide variety of other technologies including a special purpose computer, a computer system including, for example, a microcomputer, mini-computer or mainframe, a programmed microprocessor, a micro-controller, a peripheral integrated circuit element, a CSIC (Customer Specific Integrated Circuit) or ASIC (Application Specific Integrated Circuit) or other integrated circuit, a logic circuit, a digital signal processor, a programmable logic device such as a FPGA, PLD, PLA or PAL, or any other device or arrangement of devices that is capable of implementing the steps of the processes of the invention.

The processing machine used to implement the invention may utilize a suitable operating system. Thus, embodiments of the invention may include a processing machine running the Microsoft Windows™ Vista™ operating system, the Microsoft Windows™ XP™ operating system, the Microsoft Windows™ NT™ operating system, the Windows™ 2000 operating system, the Unix operating system, the Linux operating system, the Xenix operating system, the IBM AIX™ operating system, the Hewlett-Packard UX™ operating system, the Novell Netware™ operating system, the Sun Microsystems Solaris™ operating system, the OS/2™ operating system, the BeOS™ operating system, the Macintosh operating system, the Apache operating system, an OpenStep™ operating system or another operating system or platform.

It is appreciated that in order to practice the method of the invention as described above, it is not necessary that the processors and/or the memories of the processing machine be physically located in the same geographical place. That is, each of the processors and the memories used by the processing machine may be located in geographically distinct locations and connected so as to communicate in any suitable manner Additionally, it is appreciated that each of the processor and/or the memory may be composed of different physical pieces of equipment. Accordingly, it is not necessary that the processor be one single piece of equipment in one location and that the memory be another single piece of equipment in another location. That is, it is contemplated that the processor may be two pieces of equipment in two different physical locations. The two distinct pieces of equipment may be connected in any suitable manner. Additionally, the memory may include two or more portions of memory in two or more physical locations.

To explain further, processing, as described above, is performed by various components and various memories. However, it is appreciated that the processing performed by two distinct components as described above may, in accordance with a further embodiment of the invention, be performed by a single component. Further, the processing performed by one distinct component as described above may be performed by two distinct components. In a similar manner, the memory storage performed by two distinct memory portions as described above may, in accordance with a further embodiment of the invention, be performed by a single memory portion. Further, the memory storage performed by one distinct memory portion as described above may be performed by two memory portions.

Further, various technologies may be used to provide communication between the various processors and/or memories, as well as to allow the processors and/or the memories of the invention to communicate with any other entity; i.e., so as to obtain further instructions or to access and use remote memory stores, for example. Such technologies used to provide such communication might include a network, the Internet, Intranet, Extranet, LAN, an Ethernet, wireless communication via cell tower or satellite, or any client server system that provides communication, for example. Such communications technologies may use any suitable protocol such as TCP/IP, UDP, or OSI, for example.

As described above, a set of instructions may be used in the processing of the invention. The set of instructions may be in the form of a program or software. The software may be in the form of system software or application software, for example. The software might also be in the form of a collection of separate programs, a program module within a larger program, or a portion of a program module, for example. The software used might also include modular programming in the form of object oriented programming. The software tells the processing machine what to do with the data being processed.

Further, it is appreciated that the instructions or set of instructions used in the implementation and operation of the invention may be in a suitable form such that the processing machine may read the instructions. For example, the instructions that form a program may be in the form of a suitable programming language, which is converted to machine language or object code to allow the processor or processors to read the instructions. That is, written lines of programming code or source code, in a particular programming language, are converted to machine language using a compiler, assembler or interpreter. The machine language is binary coded machine instructions that are specific to a particular type of processing machine, i.e., to a particular type of computer, for example. The computer understands the machine language.

Any suitable programming language may be used in accordance with the various embodiments of the invention. Illustratively, the programming language used may include assembly language, Ada, APL, Basic, C, C++, COBOL, dBase, Forth, Fortran, Java, Modula-2, Pascal, Prolog, REXX, Visual Basic, and/or JavaScript, for example. Further, it is not necessary that a single type of instructions or single programming language be utilized in conjunction with the operation of the system and method of the invention. Rather, any number of different programming languages may be utilized as is necessary and/or desirable.

Also, the instructions and/or data used in the practice of the invention may utilize any compression or encryption technique or algorithm, as may be desired. An encryption module might be used to encrypt data. Further, files or other data may be decrypted using a suitable decryption module, for example.

As described above, the invention may illustratively be embodied in the form of a processing machine, including a computer or computer system, for example, that includes at least one memory. It is to be appreciated that the set of instructions, i.e., the software for example, that enables the computer operating system to perform the operations described above may be contained on any of a wide variety of media or medium, as desired. Further, the data that is processed by the set of instructions might also be contained on any of a wide variety of media or medium. That is, the particular medium, i.e., the memory in the processing machine, utilized to hold the set of instructions and/or the data used in the invention may take on any of a variety of physical forms or transmissions, for example. Illustratively, the medium may be in the form of paper, paper transparencies, a compact disk, a DVD, an integrated circuit, a hard disk, a floppy disk, an optical disk, a magnetic tape, a RAM, a ROM, a PROM, a EPROM, a wire, a cable, a fiber, communications channel, a satellite transmission, memory card, SIM card, or other remote transmission, as well as any other medium or source of data that may be read by the processors of the invention.

Further, the memory or memories used in the processing machine that implements the invention may be in any of a wide variety of forms to allow the memory to hold instructions, data, or other information, as is desired. Thus, the memory might be in the form of a database to hold data. The database might use any desired arrangement of files such as a flat file arrangement or a relational database arrangement, for example.

In the system and method of the invention, a variety of "user interfaces" may be utilized to allow a user to interface with the processing machine or machines that are used to implement the invention. As used herein, a user interface includes any hardware, software, or combination of hardware and software used by the processing machine that allows a user to interact with the processing machine. A user interface may be in the form of a dialogue screen for example. A user interface may also include any of a mouse, touch screen, keyboard, voice reader, voice recognizer, dialogue screen, menu box, list, checkbox, toggle switch, a pushbutton or any other device that allows a user to receive information regarding the operation of the processing machine as it processes a set of instructions and/or provides the processing machine with information. Accordingly, the user interface is any device that provides communication between a user and a processing machine. The information provided by the user to the processing machine through the user interface may be in the form of a command, a selection of data, or some other input, for example.

As discussed above, a user interface is utilized by the processing machine that performs a set of instructions such that the processing machine processes data for a user. The user interface is typically used by the processing machine for interacting with a user either to convey information or receive information from the user. However, it should be appreciated that in accordance with some embodiments of the system and method of the invention, it is not necessary that a human user actually interact with a user interface used by the processing machine of the invention. Rather, it is also contemplated that the user interface of the invention might interact, i.e., convey and receive information, with another processing machine, rather than a human user. Accordingly, the other processing machine might be characterized as a user.

Further, it is contemplated that a user interface utilized in the system and method of the invention may interact partially with another processing machine or processing machines, while also interacting partially with a human user.

It will be readily understood by those persons skilled in the art that the present invention is susceptible to broad utility and application. Many embodiments and adaptations of the present invention other than those herein described, as well as many variations, modifications and equivalent arrangements, will be apparent from or reasonably suggested by the present invention and foregoing description thereof, without departing from the substance or scope of the invention.

Accordingly, while the present invention has been described here in detail in relation to its exemplary embodiments, it is to be understood that this disclosure is only illustrative and exemplary of the present invention and is made to provide an enabling disclosure of the invention. Accordingly, the foregoing disclosure is not intended to be construed or to limit the present invention or otherwise to exclude any other such embodiments, adaptations, variations, modifications or equivalent arrangements.

What is claimed is:

1. A method for facilitating a card account-based bill payment service for a customer of a biller, comprising:
   receiving a request from the customer to initiate the card account-based bill payment service;
   at least one of a plurality of computer processors collecting customer information, the customer information including at least customer account information with the biller and card account information;
   at least one of the plurality of computer processors encrypting and storing the customer information in a first computer database;
   at least one of the plurality of computer processors providing the customer information to the biller over a communications network, comprising:
      at least one of the plurality of computer processors retrieving, from a second computer database, an identification of information required by the biller to initiate the card-based bill payment service; and
      at least one of the plurality of computer processors electronically formatting the customer account information with the biller and card account information for the biller according to the retrieved identification information;
   at least one of a plurality of-computer processors monitoring incoming transactions involving the customer's card account for a current card account charge from the biller;
   at least one of the plurality of computer processors retrieving, from the customer's card account, a current card account charge amount from the biller;
   at least one of the plurality of computer processors retrieving, from a third computer database, at least one previous card account charge amount from the biller;
   at least one of the plurality of computer processors determining an expected range for the current card account charge based on the at least one previous card account charge amount from the biller;
   at least one of the plurality of computer processors determining if the current card account charge amount is outside of the expected range for the current card account charge; and
   at least one of the plurality of computer processors notifying the customer if the current card account charge amount is outside of the expected range for the current card account charge.

2. The method of claim 1, wherein the card account is one of a credit card account and a debit card account.

3. The method of claim 1, wherein the request is received by one of an email and an on-line form.

4. The method of claim 1, wherein the step of collecting customer information comprises:
   retrieving the card account information from a fourth computer database.

5. The method of claim 1, further comprising:
   at least one of the plurality of computer processors notifying the customer of incoming transactions involving the customer's card account for a current card account charge from the biller.

6. The method of claim 1, further comprising:
   at least one of the plurality of computer processors notifying the customer if there are multiple card account charges from the biller in a billing cycle.

7. The method of claim 1, further comprising:
   at least one of the plurality of computer processors automatically disputing the current card account charge if the current card account charge amount is outside of the expected range.

8. The method of claim 1, wherein the current card account charge has a zero balance.

9. The method of claim 1, wherein the current card account charge is a duplicate of a previous card account charge.

10. The method of claim 7, further comprising:
    at least one of the plurality of computer processors automatically reporting the disputed card account charge to a credit agency.

11. The method of claim 1, further comprising:
    at least one of the plurality of computer processors automatically requesting additional information from the biller for a current card account charge if the current card account charge amount is outside of the expected range.

12. The method of claim 1, further comprising:
    at least one of the plurality of computer processors automatically transferring funds for the current card account charge amount to the biller.

13. The method of claim 1, further comprising:
    at least one of the plurality of computer processors aggregating a plurality of card account charges from the biller for a plurality of customers; and
    at least one of the plurality of computer processors automatically transferring funds for the plurality of card account charges to the biller.

14. The method of claim 1, wherein the step of collecting customer information comprises
- receiving oral customer information using a voice response system; and
- at least one of the plurality of computer processors automatically converting the oral customer information to text-based customer information.

15. The method of claim 1, wherein at least two of the first computer database, the second computer database, and the third computer database are the same.

* * * * *